June 5, 1945.  G. F. ARCHER  2,377,742
EXPLOSIVE-CARRIER SENSITIVE TO AIRPLANE
INDUCED AERIAL DISTURBANCES
Filed Dec. 15, 1941
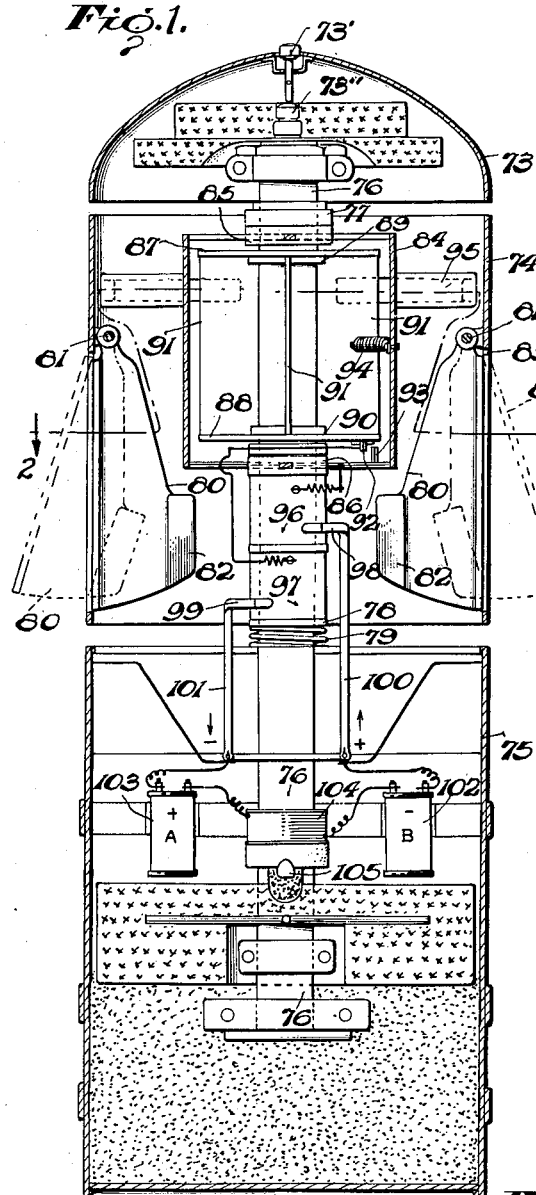
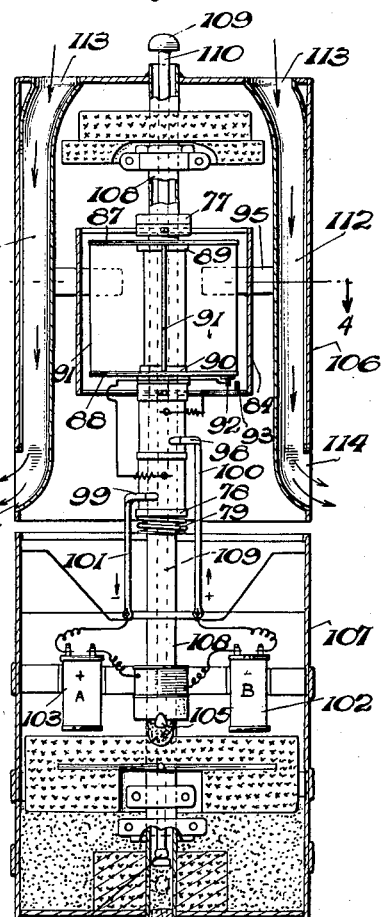
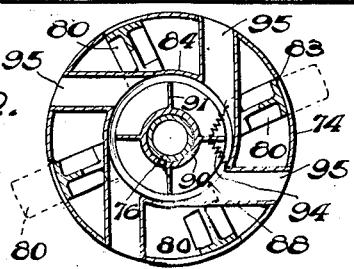
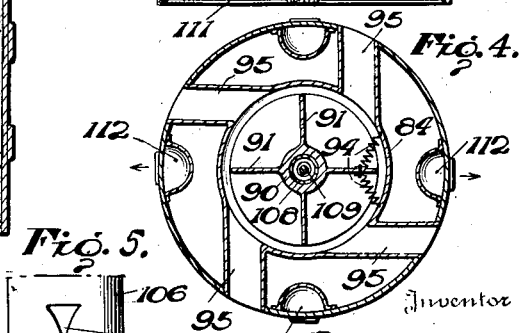
Inventor
GEORGE F. ARCHER.
By Frederick Barker
Attorney Patented June 5, 1945

2,377,742

UNITED STATES PATENT OFFICE 2,377,742

EXPLOSIVE CARRIER SENSITIVE TO AIRPLANE INDUCED AERIAL DISTURBANCES

George F. Archer, New York, N. Y.

Application December 15, 1941, Serial No. 423,081

6 Claims. (Cl. 102—56)

This invention relates to anti-aircraft shells and other explosive-carriers and my improvements are directed to means enabling such shells and carriers to explode under and through the influence of abnormal atmospheric conditions such as are created within a limited surrounding area by an airplane in flight.

Bombing aircraft when at high altitudes present targets upon which direct hits are not easily made from the surface and the purpose of my invention is to provide means whereby a shell or the like containing a high explosive, such for example as TNT, may be caused to explode when in an area or zone occupied by the aircraft, the proximity of the explosion entailing destruction of the aircraft.

The aerial disturbances which I refer to as abnormal atmospheric conditions, are those created by an airplane, or the like, in flight. The propeller slip streams and the wake following the airplane constitute actuating air pressure impulses relied upon by me for co-action with responsive instrumentalities upon the shell or carrier for the discharge of its explosive.

While without definite knowledge as to the extent of the area, surrounding an airplane in flight, which circumscribes the disturbed aerial condition, it at any rate considerably enlarges the target zone in which a discharged high explosive will prove effective, and that is the main object of the present invention.

Other features and advantages of my invention will hereinafter appear.

In the drawing:

Fig. 1 is an elevation in section of the preferred form of my invention.

Fig. 2 is a section taken on line 2—2 of Fig. 1.

Fig. 3 is an elevation in section of another form of my invention.

Fig. 4 is a section taken on line 4—4 of Fig. 3.

Fig. 5 is a detail view in elevation of a portion of the shell of Fig. 3 showing a duct outlet in the shell casing.

In the following description the various forms of my invention will be referred to in conjunction with the particular views in the drawing identified therewith.

In the preferred embodiment of my invention which is disclosed in Figs. 1 and 2 of the drawing I provide a shell which is sensitive to aerial disturbances created by an airplane in flight and which is designed to explode when within a zone in which the air is so disturbed without the necessity of actual contact with a relatively solid body.

The shell disclosed in Fig. 1 of the drawing comprises three main sections which are normally spaced apart. Such sections consist of the usual war head 73, the central section or shell proper 74 and the base section 75. A shaft 76 extends centrally through the shell and is rigidly connected to the war head and the base section to thereby connect these sections together against rotation or axial displacement relative to the shaft, the central section or shell proper 74 being loosely journaled on the shaft for rotation and limited axial displacement thereon by means of the bearings 77 and 78. The central section being normally spaced from the base section by means of a recoil spring 79 mounted between said sections and coiled about the shaft 76. It will be understood that the recoil spring provides a cushioning means between the two sections to take care of the sudden upward push which occurs when the shell is fired.

The war head 73 is provided with the usual firing pin 73' and cap 73'' and TNT so that the shell will explode in the usual manner if it contacts an object.

The central section or shell proper 74 constitutes a housing for the operating elements of my shell, which elements are sensitive to the fugitive air waves or air pressures created by an airplane or the like in flight for actuation to close an electric circuit whereby the shell is exploded, even though no object is actually contacted. When a shell is fired from a gun the rifling in the gun barrel causes the shell to spin in its flight through the air. I have provided means mounted within the central section adapted to swing outwardly therefrom for preventing or substantially retarding the spinning of the central section, while the war head and the base section may continue their rapid synchronous spinning. This spinning of the war head and base section while the spinning of the central section is stopped is the result of the particular mounting of the three sections on the shaft 76, and prevents the shell from tumbling in its aerial flight even though the spinning of the central section is prevented or substantially retarded.

I employ two sets of wings 80, the wings of each set being diametrically opposed, and pivotally mounted at 81 within and to the central section, the wings being of generally segmental form. Each wing is weighted as at 82 at the lower end thereof. The central section is provided with slots 83 for receiving therethrough the wings when they swing outwardly. When the shell is fired and moves forward out of the gun barrel the wings will fly out through the slots 83 to extend outside of the central section of the shell for contact with the air. The construction and mounting of the wings insures the outward swinging thereof, the weighted portions of the wings being so positioned that the center of gravity will be substantially in the vertical plane of the slots, thus the normal free position of the wings will be the outwardly swung position. While I have shown two sets of wings in the drawing it is to be understood that it is within the scope of my invention to utilize either a greater or a lesser number of wings.

An inertia or circular cage member 84 is rotatably journaled on shaft 76 within the central section 74 by means of bearings 85 and 86. The cage member is formed to provide an open framework for the relatively free passage of air therethrough. Disposed within and concentric to the cage 84 are two circular disks 87 and 88 which are rotatably journaled on the shaft 76 by means of bearings 89 and 90, the disks being spaced apart axially of the shaft and connected together for synchronous rotation by means of vanes 91 which are mounted on the disks and extend therebetween. I preferably use four of such vanes which are oppositely disposed in pairs. The disks with the vanes mounted thereon comprise in its entirety what I shall term a rotor and is substantially light in weight as compared to the inertia or cage member, which is a relatively heavy member to provide the required inertia.

Mounted on the disk 87 of the rotor and projecting downwardly therefrom is an electric contact 92, and another electric contact 93 projects upwardly from the cage 84, the two contacts being so arranged that upon rotation of the rotor the two contacts will engage, and being further so arranged that the contacts are normally held out of engagement. For this purpose springs 94 are attached to both sides of one of the vanes on the rotor and extend therefrom for attachment to the inertia member. The springs are suitably mounted for adjustment to vary the tension between the rotor and the cage. Thus the rotor and the inertia member are relatively rotatable against the tension exerted by the spring. When the rotor is rotated to engage the contacts the relatively heavy inertia member will not give or rotate and a close contact will be maintained.

As will be hereinafter explained it is necessary that the rotor be stationary except under certain conditions as when a force is exerted thereon to produce slight rotation. The springs 94 serve this purpose of normally preventing rotation of the rotor. The springs are attached to the cage member, which being relatively heavy operates as an inertia member and normally will not rotate and will therefore serve in effect as a means for normally preventing rotation of the rotor. When the necessary force is exerted on the rotor the spring tension will be overcome and the rotor will rotate to make the electric contact.

Ducts 95 having their outer ends open to the atmosphere through holes which are provided in the central section, extend between the inertia member and the wall of the central section and are substantially tangentially disposed with respect to the inertia member.

Two slip or contact rings 96 and 97 of substantial length are spacedly mounted on the shaft 76 within the central section and are insulated from said shaft and from each other. Brushes 98 and 99 are supported by brush holders 100 and 101 in position in constant contact with the slip or contact rings. The brush holders extend from the central section into the base section 76 in which they are mounted in any suitable manner. As the base section is relatively rotatable with respect to the central section, and if it is found desirable to use a bottom closure for the central section any suitable means may be provided in such closure for receiving therethrough the brush holders, for instance, an annular slot would serve the purpose.

Disposed within the base section are electric batteries 102 and 103 with which the brush holders are in electric contact, and the batteries are in electric contact with a coil 104 which is associated with a firing cap 105 by means of which the TNT in the base section is exploded.

When the shell of this preferred form of my invention leaves the gun the base section and the war head will be spinning and the wings will swing out through the slots in the central section to substantially retard or prevent the spinning of that section. Hence, the shell will take a true course without tumbling even though the spinning of the central section is prevented. The cage member will not rotate due to its weight and resultant inertia effect and the rotor will therefore remain stationary due to the tension spring by means of which it is anchored to the cage. Hence the operating elements will remain stationary as the shell travels toward a zone of aerial disturbance. When such a zone is entered the pressures or fugitive air waves will flow into the tangentially disposed ducts causing pressures therein which will be directed against the vanes of the rotor causing the rotor to overcome the tension of the spring to thereby move or rotate so as to bring the contacts 92 and 93 into engagement closing an electric circuit. As the cage is a relatively heavy member it will not give or rotate so that the contacts will be held together.

When the rotor is rotated and the contacts 92 and 93 are thereby brought into engagement an electric circuit is closed through battery 103 to brush holder 101 to brush 99 to slip ring 97 to rotor contact 92 to contact 93 on cage then to slip ring 96 then to brush 98 to brush holder 100 to battery 102 to coil 104 which is excited to make a spark to fire the cap 105 and thereby explode the shell, even though the airplane or the like object has not been physically contacted.

In the form of my invention disclosed in Figs. 3 and 4 of the drawing in which I use the same reference numerals as in Figs. 1 and 2 to designate elements of the apparatus which are the same as those described with reference to Figs. 1 and 2, I provide a shell in which I achieve the same results as those achieved by the shell of my preferred embodiment without using the outwardly swinging wings and with certain other structural changes.

The shell of this form of my invention comprises two main sections 106 and 107 which are spaced apart upon a hollow shaft 108 which extends through the sections and is rigidly connected to the base section 107. The section 106 being loosely journaled on the shaft in the same way that the central section in Fig. 20 is journaled on the shaft.

A firing pin 109 is disposed externally of the shell and is provided with a stem 110 adapted to extend through the hollow shaft into the base section for engagement with a cap 111 when the firing pin 109 is depressed to thereby explode the TNT housed within the base section. The firing pin and cap being embodied in the shell for explosion thereof in the event an object is hit.

In order to prevent or substantially retard spinning of the section 106 which houses the operating elements and to stabilize the shell I provide a plurality of substantially longitudinally extending ducts 112 through the section 106 from the top or head portion thereof to a point adjacent the lower end thereof. I thus provide air inlets 113 and outlets 114 for the ducts. I form the outlets 114 of generally V-shape so that the air emerges from the ducts in a thin vane at the lower part of the openings or outlets 114 as shown particularly in Fig. 5 of the drawing.

The operating elements whereby the shell is exploded when in a zone of aerial disturbance are the same as those shown in Figs. 1 and 2 and described with reference thereto. The electric circuits, contacts and disposition of elements are the same and therefore will not be again described.

When the shell of this form of my invention leaves the gun barrel the base section 107 will spin due to the rifling of the gun barrel but the section 106 being loosely journaled on the shaft will not spin due to the air pressures set up by the air rushing through the ducts 112, thus the shell will be held to a straight course and spinning of the shell section housing the operating elements will be prevented. The prevention of spinning of section 106 is accomplished by my particular structure of the air outlets 114 which are so formed that the air will flow therefrom in thin jets which will tend to hold against the surrounding air to act as a brake against spinning by the section 106 and by the downward push or pressures exerted by the air rushing through the ducts. Hence the entire assembly within the section 106 will not rotate or spin.

When the shell enters a zone of aerial disturbance pressures will be set up in the tangential ducts 95 to rotate the rotor to cose the circuit and explode the shell all in a manner the same as described with reference to Figs. 1 and 2 of the drawing.

It is also within the scope of my invention to dispose the ducts 112 at various angles to the vertical plane of the shell than those shown in Fig. 3 of the drawing. For instance, I contemplate disposing such spinning preventing ducts diagonally to the vertical plane of the shell. By altering the "pitch" of such ducts the spinning could be influenced to reverse the spin or the tendency to spin.

It is to be understood that any suitable means may be inserted in the electric circuit within the shell for regulating the altitude which must be reached before the shell may be exploded. Such means may comprise a barometric device such as a bellows which is responsive to changes in atmospheric pressure and which normally holds the circuit open but which is adapted at a given altitude to close the circuit so that upon rotation of the rotor by the action of fugitive air waves to bring the contacts 92 and 93 into engagement the shell will be exploded.

Variations within the spirit and scope of my invention are equally comprehended by the foregoing disclosure.

I claim:

1. A shell, comprising spaced independently rotatable sections, means for mounting and retaining said sections in spaced relation, means carried by one of said sections for preventing the rotation thereof during the flight of the shell through the air, ducts disposed within said shell section, and means within said non-rotatable shell section disposed therein in the path of said ducts and movable on an axis parallel to the axis of the shell, such means being responsive to the influence of fugitive air waves for its movement, and means operable by said movable means, in its movement, to cause the explosion of the shell charge.

2. A shell, comprising spaced independently rotatable sections, means for mounting and retaining said sections in spaced relation, means carried by one of said sections for preventing the rotation thereof during the flight of the shell through the air, ducts disposed within said shell section, and movable means within the shell disposed therein in the path of said ducts and responsive to the influence of fugitive air waves for its movement, including a rotor having an electric contact thereon, and an inertia member having an electric contact thereon, tension means connecting said rotor and said inertia member to hold said rotor in normal position separating said contacts, and a normally open electric circuit being closed upon engagement of said electric contacts by movement of said motor, to thereby cause the explosion of said shell charge.

3. A shell, comprising spaced independently rotatable sections, means for mounting and retaining said sections in spaced relation, means carried by one of said sections for preventing the rotation thereof during the flight of the shell through the air, including air ducts extending through said section having inlet openings in the head of said section and outlet openings in the wall of said section adjacent the lower end thereof, and further ducts disposed within said shell section, and movable means within the shell disposed therein in the path of said further ducts and responsive to the influence of fugitive air waves for its movement, and means operable by said movable means, in its movement, to cause explosion of the shell charge.

4. A shell comprising spaced independently rotatable sections, means for mounting and retaining said sections in spaced relation, means carried by one of said sections for preventing the rotation thereof during flight of the shell through the air, means sensitive to fugitive air waves mounted in said non-rotatable section, and movable on an axis parallel to the axis of the shell, air ducts in said section open at one end to the atmosphere and adapted to receive therein fugitive air waves, and disposed in said shell section substantially tangentially to said movable means to direct said fugitive air waves against said movable means for movement thereof, and means operable by said movable means, in its movement, to cause the explosion of the shell charge.

5. A shell, comprising sections spacedly mounted on an axially disposed shaft, one of said sections being mounted thereon for rotation relative to said shaft and the other of said sections being connected to said shaft for rotation therewith, means carried on said first mentioned section for preventing rotation thereof during the flight of the shell through the air, an explosive charge in said shaft connected section, means for setting off the charge, ducts disposed within said first mentioned section and means disposed within said first mentioned section and journaled on said shaft and responsive to the influence of fugitive air waves entering said ducts for actuating said means for setting off the charge, to thereby explode the charge.

6. A shell, comprising spaced independently rotatable sections, an axially disposed shaft spacedly mounting said sections, means carried by one of said sections for preventing the rotation thereof during the flight of the shell through the air, ducts disposed within said shell section and movable means within the shell disposed therein in the path of said ducts and responsive to the influence of fugitive air waves for its movement, including a rotor journaled on said shaft and having an electric contact thereon, and an inertia member journaled on said shaft and having an electric contact thereon, tension means connecting said rotor and said inertia member to hold said rotor in normal position separating said contacts, and a normally open electric circuit being closed upon engagement of said electric contacts by rotation of said rotor to thereby cause the explosion of said shell charge.

GEORGE F. ARCHER.